(12) United States Patent
Nagasgima et al.

(10) Patent No.: US 8,605,300 B2
(45) Date of Patent: Dec. 10, 2013

(54) IMAGE FORMING APPARATUS WITH TURNABLE IMAGE READING PART AND SUSPENDING MECHANISM

(75) Inventors: Teruhiko Nagasgima, Osaka (JP); Akinori Matsuno, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 584 days.

(21) Appl. No.: 12/952,599

(22) Filed: Nov. 23, 2010

(65) Prior Publication Data

US 2011/0134455 A1 Jun. 9, 2011

(30) Foreign Application Priority Data

Dec. 8, 2009 (JP) .................................. 2009-278531
Dec. 28, 2009 (JP) .................................. 2009-297776

(51) Int. Cl.
*G06F 3/12* (2006.01)

(52) U.S. Cl.
USPC ........... 358/1.13; 358/1.1; 358/494; 358/496; 358/497; 358/498; 399/107; 399/110; 399/124; 399/125; 399/119; 399/111; 399/367; 399/379; 400/693

(58) Field of Classification Search
None
See application file for complete search history.

(56) References Cited

U.S. PATENT DOCUMENTS

| 6,510,301 | B2 * | 1/2003 | Tanaka ........................ 399/125 |
| 7,447,466 | B2 * | 11/2008 | Ikebata ........................ 399/110 |
| 7,561,825 | B2 * | 7/2009 | Hirose et al. ................. 399/110 |
| 7,804,628 | B2 * | 9/2010 | Hashimoto et al. ........... 358/494 |
| 8,081,899 | B2 * | 12/2011 | Ito ................................ 399/110 |
| 2005/0031371 | A1 | 2/2005 | Kaida et al. |
| 2005/0196217 | A1 | 9/2005 | Nishimura et al. |
| 2007/0098440 | A1 | 5/2007 | Ikebata |

FOREIGN PATENT DOCUMENTS

| JP | 2002-156005 | 5/2002 |
| JP | 2003-101704 | 4/2003 |
| JP | 2007-264041 A | 10/2007 |

* cited by examiner

*Primary Examiner* — Paul F Payer
(74) *Attorney, Agent, or Firm* — Smith, Gambrell & Russell, LLP (57) ABSTRACT

Am MFP (100) is provided with: a casing (22) which is turnably supported at a turning support point (25) to an apparatus main body (40) and which stores an image reading part (20) capable of optically reading a document; and an outer cover (23) which is turnably supported at a turning support point (21) to the apparatus main body (40) and which has a top surface (23a) opposing a bottom surface (66) of the casing (22) and a bottom surface (23b) covering image forming means, and is provided with a suspending mechanism that opens and closes the outer cover (23) in conjunction with opening and closing operation of the casing (22), and the turning support point (21) of the outer cover (23) is arranged with a distance from the turning support point (25) of the casing (22) toward a turning end of the casing (22).

6 Claims, 10 Drawing Sheets

IMAGE FORMING APPARATUS WITH TURNABLE IMAGE READING PART AND SUSPENDING MECHANISM

This application is based on Japanese Patent Application No. 2009-278531 filed on Dec. 8, 2009 and Japanese Patent Application No. 2009-297776 filed on Dec. 28, 2009, the contents of which are hereby incorporated by reference.

BACKGROUND OF THE INVENTION

1. Technical Field of the Invention

The present invention relates to an image forming apparatus and more specifically to an improvement in maintainability of a copier provided with an image reading part above an image forming part.

2. Description of Related Arts

Conventionally known is a xerographic image forming apparatus that attaches a toner to an electrostatic latent image formed on an image carrier to form a visible image (toner image) and then transfers it onto a recording medium. Put into practice in such an image forming apparatus is a method of improving maintenability by using a cartridge-type toner container that refills a developing device with a toner or using a developing cartridge that integrates a developing device and a toner container.

In a case where the toner container or the developing cartridge is loaded at an upper part in the image forming apparatus, an outer cover provided at a discharge part (recording paper loading part) on a top surface of an apparatus main body is opened to perform cartridge replacement. However, in a copier where an image reading part (scanner part) is set on and above of the apparatus main body, the outer cover cannot be opened widely, which results in deteriorated performance of cartridge replacement operation.

To provide a wide open angle of the outer cover, a space from the top surface of the apparatus to the image reading part may be widened, but this results in a high position of the image reading part, thus deteriorating operability of the image reading part and an operation part attached thereto. Moreover, a dimension of the entire apparatus increases, which goes against downsizing recently demanded. Disclosed as a countermeasure against this is a structure that permits maintenance and attachment and detachment of members by opening the casing storing the scanner part from the image forming apparatus main body to make the inside of the image forming apparatus main body visible.

For example, disclosed is an image forming apparatus having an image reading part (image scanner) loaded at an opening and closing cover on a top surface of the apparatus and permitting a cartridge to be easily taken out by opening the opening and closing cover together with the image reading part. Moreover, described is a method of performing jam processing by turning upward a turnable reading and loading base loaded with an image reading part and then pulling out a cartridge by opening a top cover capable of opening and closing by turning. Further disclosed is an image forming apparatus which has at a bottom surface of an image reading part an outer wall member also serving as a discharge tray and also serving as an outer wall of an apparatus main body and which, with configuration such that the outer wall member opens with respect to the apparatus main body in conjunction with opening operation of the image reading part, permits access to inside of the apparatus main body.

SUMMARY OF THE INVENTION

However, with the method of loading the image reading part at the opening and closing cover on the top surface of the apparatus and then opening the opening and closing cover together with the image reading part, turning support points of the image reading part and the opening and closing cover are the same, which therefore requires arrangement of the image reading part and the opening and closing cover in a superimposed manner, resulting in limited configuration of the apparatus. Providing a large open angle of the opening and closing cover inevitably results in a large open angle of the image reading part, but providing the large open angle of the image reading part that weighs much results in great load imposed on the turning support points. This therefore requires configuration of the turning support points that can bear the load, which leads to a cost increase and also a safety problem.

With the method of opening the top cover capable of opening and closing by turning after turning upward the turnable reading and loading base loaded with the image reading part, the reading and loading base and the top cover need to be turned sequentially, which results in an increase in procedures at time of cartridge replacement, leading to a problem that replacement operation is troublesome. Described here is, as an example, the configuration such that the cartridge is arranged immediately below the outer cover, but the same problem arises for maintenability in a case where a different unit is arranged immediately below the outer cover. Further, not only with the xerographic type but also with, for example, an ink-jet type, in a case where the image reading part is set above the apparatus main body, there is possibility that maintenability in, for example, ink cartridge replacement deteriorates.

On the other hand, with the configuration such that the outer wall member opens with respect to the apparatus main body in conjunction with the opening operation of the image reading part, due to a structure such that the outer wall member opens wide only by opening the casing of the image reading part to a small degree, the access to the inside of the apparatus main body can be achieved by easier operation than with different configuration, considering that the document conveying device and image reading part described above weigh very much. However, to open and close the outer wall member in conjunction with the opening and closing operation of the image reading part, a plurality of link members for holding open postures of the image reading part and the outer wall member are required, which results in complication due to an increase in the number of components, thereby leading to a problem that the apparatus main body becomes large-sized.

Moreover, although attention needs to be given not to impair the secondary external view of the image forming apparatus with the image reading part in an open state, with the configuration such that the outer wall member opens with respect the apparatus main body in conjunction with the opening operation of the image reading part, the plurality of link members arranged at the apparatus main body is seen from a front surface when the image reading part is opened from the image forming apparatus main body.

In view of the problems described above, it is an object of the present invention to provide an image forming apparatus which can improve opening and closing performance of an outer cover with simple configuration, requires a small number of components, and also does not impair downsizing of an apparatus main body and a secondary external view of the apparatus, without leading to apparatus upsizing and operability deterioration.

To achieve the object described above, an image forming apparatus according to one aspect of the invention includes: an apparatus main body including an image forming part therein; an outer cover which is turnably supported at a first turning support point of the apparatus main body and which is capable of opening and closing a top surface of the apparatus main body; an image reading part arranged above the outer cover with a predetermined space therefrom, supported at a second turning support point of the apparatus main body in a manner such as to be turnable in the same direction as a direction in which the outer cover turns, and reading a document through scanning, wherein the first turning support point is arranged with a distance from the second turning support point toward a turning end of the image reading part, and a suspending mechanism turnably coupling together the image reading part and the outer cover is provided.

Still another object of the invention and detailed advantages provided by the invention will be more clarified by an embodiment described below.

DETAILED DESCRIPTION OF THE PREFERRED EMBODIMENTS

Figure 1:
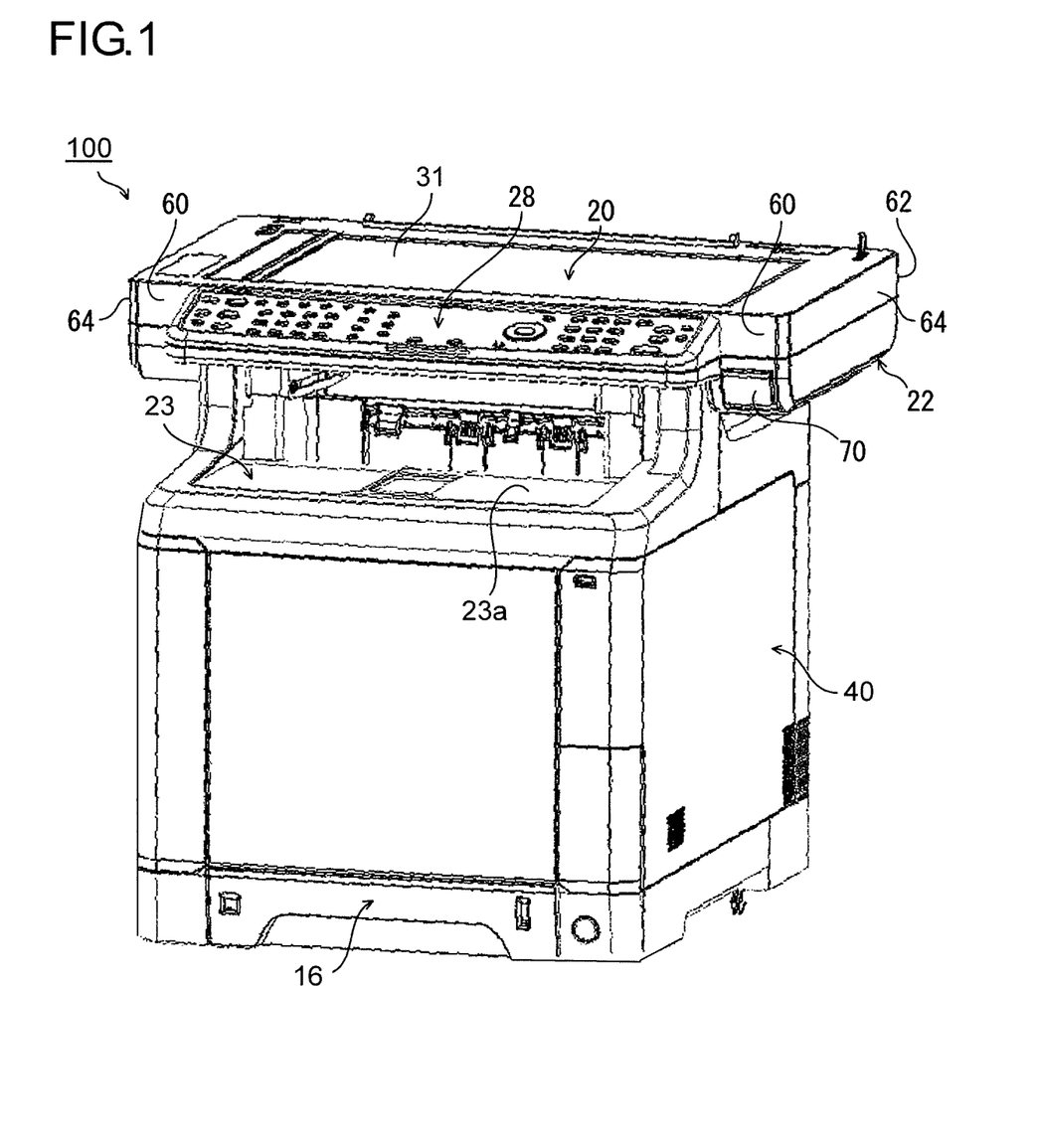
FIG. 1 is an external perspective view of an image forming apparatus according to one embodiment of the present invention.
Figure 2:
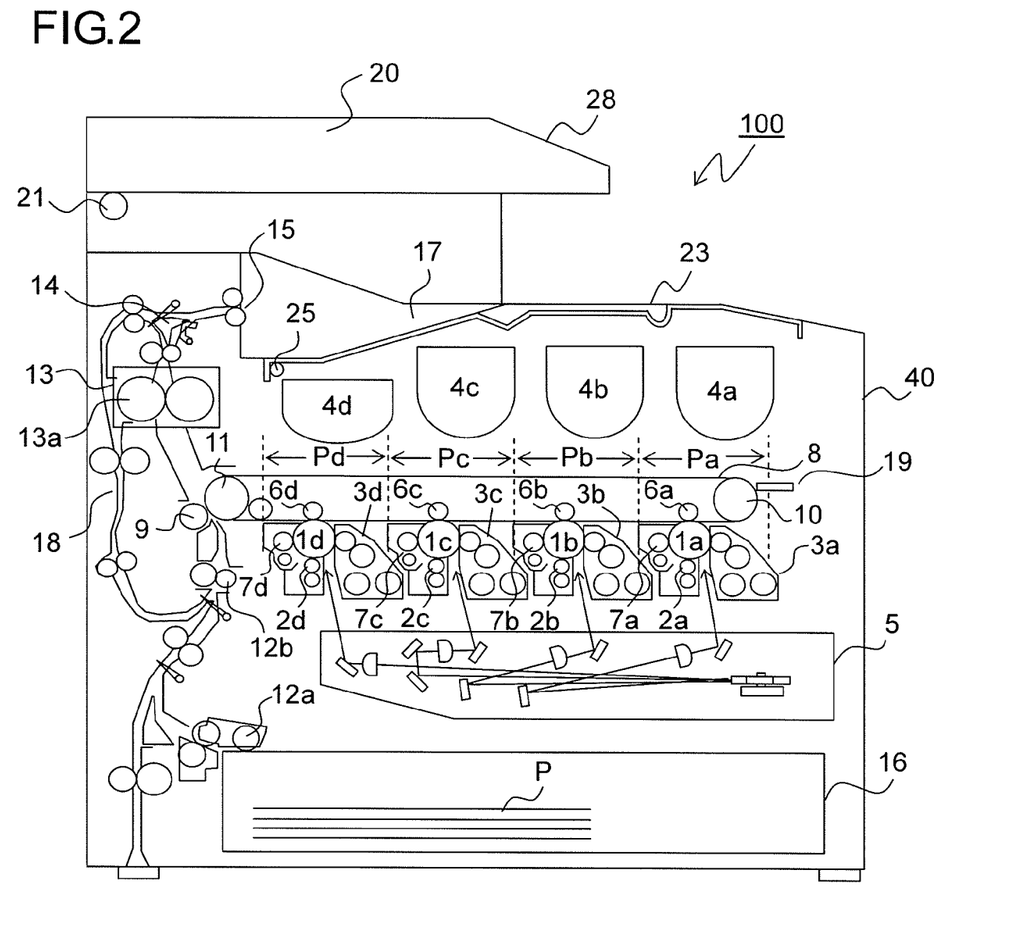
FIG. 2 is a sectional side view showing internal configuration of the image forming apparatus of FIG. 1.

Hereinafter, embodiments of the present invention will be described with reference to the accompanying drawings. FIGS. 1 and 2 are external perspective view and schematic sectional view of an image forming apparatus according to the first embodiment of the invention, where a color digital compound machine of a tandem type, a so-called multiple function peripheral (hereinafter referred to as MFP) is shown. Shown in FIG. 1 are: a front surface of the MFP 100 facing a user; and a right side surface of the MFP 100. This MFP 100 is provided with an apparatus main body 40 of a box shape, above which paper is discharged.

Specifically, the top of an apparatus main body 40 is covered with an outer cover 23, and a top surface 23a of the outer cover 23 shown in FIG. 1 functions as a discharge tray 17 (see FIG. 2). Right, left, and rear sides of the apparatus main body 40 of this embodiment protrudes upward and rearward with respect to the top surface 23a in FIG. 1, and above the apparatus main body 40, an image reading part 20 of an optical type is set.

The image reading part 20 is stored in a casing 22 having a contact glass 31 fitted on a top surface thereof, and components of the image reading part 20 are stored inside the casing 22 below the contact glass 31. Specifically, it is composed of: a scanning optical system (carriage) loaded with a scanner lamp that illuminates a document at time of copying and a mirror that changes an optical path of reflected light from the document; a condensing lens that condenses and focuses the reflection light from the document; a CCD sensor that converts focused image light into an electrical signal; and so on (all not shown). The scanning optical system moves along a longitudinal direction of the casing 22 while irradiating light toward the contact glass 31, thereby reading a document image and converting it into image data.

Although not shown, on a top surface of the image reading part 20, a document holding plate loaded with an auto document feeder (hereinafter referred to as ADF) for conveying a document to an image reading position in the casing 22 is supported in an openable and closeable manner. When the MFP 100 is used as a copier, a facsimile, or a network scanner, the document is conveyed from the ADF to the image reading part 20, and an image surface of the document is optically read by the image reading part 20.

The casing 22 is formed of a substantially rectangular solid shape whose longitudinal width is larger than a width of the front surface of the MFP 100, and is turnably supported at a turning support point 21 (see FIG. 2) of the MFP 100 main body with a predetermined gap from the top surface 23a of the outer cover 23. Moreover, in order to regulate unnecessary turning of the image reading part 20, a lock mechanism (to be described below) is provided which couples the image reading part 20 to the MFP 100 main body in a state of FIG. 1.

Disposed at the casing 22 is an operation panel 28 protruding toward the front of the apparatus. Provided on the operation panel 28 are: a plurality of operation keys provided for various user operations; and an operation screen displaying various pieces of information such as character information, a guide image, etc. Contents of these operations are reported to a controller 38 (see FIG. 3).

On the other hand, arranged at the bottom of the apparatus main body 40 is a paper cassette 16 of a front loading type. The paper cassette 16 can store pieces of sheet paper in a manner such as to stack them in a thickness direction, and can be withdrawn from the apparatus main body 40.

Next, internal configuration of the MFP 100 and image formation operation will be described with reference to FIG. 2. In the apparatus main body 40 of the MFP 100, four image forming parts (print engines) Pa, Pb, Pc, and Pd are disposed in order from a front side (right side in FIG. 2) to the rear of the apparatus main body 40. These image forming parts Pa to Pd are provided in correspondence with images of four different colors (cyan, magenta, yellow, and black), and sequentially form the cyan, magenta, yellow, and black images, respectively, through charging, exposure, development, and transfer processes.

In the image forming parts Pa to Pd, photoconductive drums 1a, 1b, 1c, and 1d that carry visible images (toner images) of the respective colors are disposed, and an intermediate transfer belt 8 that is rotated clockwise in FIG. 1 by driving means (not shown) is provided adjacently to the image forming parts Pa to Pd. The toner images formed on these photoconductive drums 1a to 1d are sequentially primarily transferred onto the intermediate transfer belt 8, which moves while making contact with each of the photoconductive drums 1a to 1d, in a manner such as to be superimposed on each other, are then secondarily transferred onto paper P as one example of a recording medium under action of a secondary transfer roller 9, are further fixed onto the paper P in a fixing part 13, and are then discharged from the apparatus main body. Processes of image formation are executed on the photoconductive drums 1a to 1d while rotating the photoconductive drums 1a to 1d counterclockwise in FIG. 1.

The paper P onto which the toner images are to be transferred is stored in the paper cassette 16 at the bottom of the apparatus main body 40, and is conveyed to a nip part between the secondary transfer roller 9 and a driving roller 11, to be described below, of the intermediate transfer belt 8 via a paper feed roller 12a and a registration roller pair 12b. For the intermediate transfer belt 8, a sheet of dielectric resin is used, and a seamless belt is mainly used. Arranged downstream of the secondary transfer roller 9 is a belt cleaner 19 of a blade-like shape for removing, for example, the toner remaining on a surface of the intermediate transfer belt 8.

Next, the image forming parts Pa to Pd will be described. Provided around and below the photoconductive drums 1a to 1d rotatably disposed are: charging devices 2a, 2b, 2c, and 2d that charge the photoconductive drums 1a to 1d; an exposure device (laser unit) 5 that exposes image information to the photoconductive drums 1a to 1d; developing devices 3a, 3b, 3c, and 3d that form the toner images on the photoconductive drums 1a to 1d; and cleaning parts 7a, 7b, 7c, and 7d that remove, for example, a developer (toner) remaining on the photoconductive drums 1a to 1d.

When image data from the image reading part 20 has been inputted, surfaces of the photoreceptor drums 1a to 1d are first uniformly charged by the charging devices 2a to 2d, and then light is irradiated by the exposure device 5 in accordance with the image data to form electrostatic latent images onto the respective photoconductive drums 1a to 1d in accordance with the image data. The developing devices 3a to 3d are respectively filled with predetermined amounts of two-component developers containing the toners of the respective colors including cyan, magenta, yellow, and black. In accordance with toner consumption in the two-component developers filled in the respective developing devices 3a to 3d as a result of toner image formation to be described below, the toners are refilled into the respective developing devices 3a to 3d from toner containers 4a to 4d. The toners in these developers are supplied onto the photoconductive drums 1a to 1d by the developing devices 3a to 3d, and electrostatically adhere thereto, whereby the toner images in accordance with the electrostatic latent images formed through the exposure by the exposure device 5 are formed.

Then predetermined voltage is applied to primary transfer rollers 6a to 6d, whereby the yellow, cyan, magenta, and black toner images on the photoconductive drums 1a to 1d are primarily transferred onto the intermediate transfer belt 8. These images of the four colors are formed with predetermined positional relationship previously defined for predetermined full color image formation. Then in preparation for formation of a new electrostatic latent image to be performed subsequently, for example, the toners remaining on the surfaces of the photoconductive drums 1a to 1d are removed by the cleaning parts 7a to 7d.

The intermediate transfer belt 8 is stretched over a driven roller 10 on an upstream side and the driving roller 11 on a downstream side. Upon clockwise rotation of the intermediate transfer belt 8 following rotation of the driving roller 11 by a driving motor (not shown), the paper P is conveyed from the registration roller pair 12b to the nip part (secondary transfer nip part) between the driving roller 11 and the secondary transfer roller 9 provided adjacently thereto at predetermined timing, and a full color image on the intermediate transfer belt 8 is transferred onto the paper P. The paper P with the toner image transferred thereon is conveyed to the fixing part 13.

The paper P conveyed to the fixing part 13 is heated and pressurized by a fixing roller pair 13a whereby the toner images are fixed onto a surface of the paper P, thereby forming a predetermined full color image. A conveyance direction of the paper P with the full color image formed thereon is sorted by a diverging part 14 diverging in a plurality of directions. To form an image on only one side of the paper P, the paper P is discharged directly to the discharge tray 17 by a discharge roller 15. A paper loading surface of the discharge tray 17 also serves as the outer cover 23, and the outer cover 23 is turnably supported at a turning support point 25 to the MFP 100 main body.

On the other hand, to form an image on both sides of the paper P, the paper P that has passed through the fixing part 13 is temporarily conveyed toward the discharge roller 15, and after a rear edge of the paper P passes through the diverging part 14, the discharge roller 15 is inversely rotated and a conveyance direction of the diverging part 14 is switched, whereby the paper P is distributed to a paper conveyance path 18 from the rear edge of the paper P and conveyed to the secondary transfer nip part again with an image surface inverted. Then a next image formed on the intermediate transfer belt 8 is transferred by the secondary transfer roller 9 onto the surface of the paper P on which no image is formed, and the paper P is conveyed to the fixing part 13 where the toner image is fixed and then discharged to the discharge tray 17.

Figure 3:
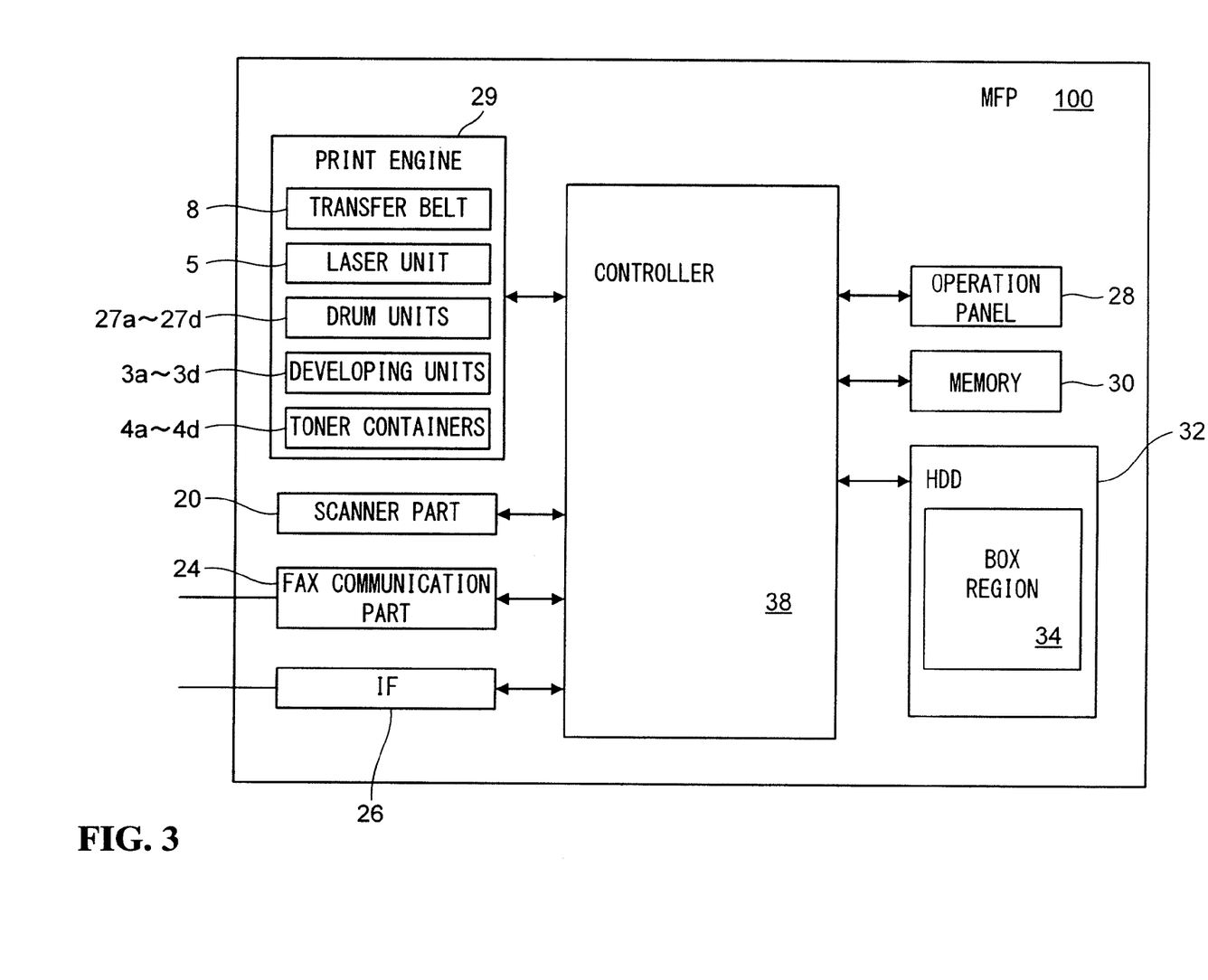
FIG. 3 is a block diagram showing a control path including a controller of the image forming apparatus of FIG. 1.

FIG. 3 is a schematic configuration diagram showing a control path including the controller 38 of the MFP 100. The MFP 100 is connected to a network via a network interface (IF) 26, and also further connected to a public line. The MFP 100 executes various operations in accordance with program instructions. The MFP 100 has, for example, a copy function, a send function, and a box function.

Specifically, an HDD 32 is provided with a box region 34, sequentially saves various pieces of data such as a print job sent from a client's PC, a scan job read at the image reading part 20, a facsimile job received at a fax communication part 24, etc., and thus has the box function. Further, the MFP 100 is provided with a memory 30. The memory 30 has a ROM, a RAM, etc. and stores, for example, programs related to various processing operations.

The fax communication part 24 described above has the send function and sends the facsimile job saved in the HDD 32 toward a destination. The print engines (image forming parts) Pa to Pd has: drum units 27a to 27d including the photoconductive drums 1a to 1d, the charging devices 2a to 2d, and the cleaning parts 7a to 7d (see FIG. 2); the developing devices 3a to 3d that develop the toner images by use of the toners in the toner containers 4a to 4d for the corresponding colors; and the intermediate transfer belt 8 that transfers the toner images onto the paper. The print engines Pa to Pd are connected to, for example, an ADF that conveys a document to an image reading position of the image reading part 20, the paper cassette 16 that stores the paper, and has the copy function of outputting to the paper the print job, etc. saved in the HDD 32 and discharging the document to the top surface 23a (discharge tray 17) of the outer cover 23.

As shown in FIG. 2, the intermediate transfer belt 8, the drum units 27a to 27d (the photoconductive drums 1a to 1d, the charging devices 2a to 2d, and the cleaning parts 7a to 7d), the developing devices 3a to 3d, and the toner containers 4a to 4d are stored above the paper cassette 16 in the apparatus main body 40.

Figure 4:
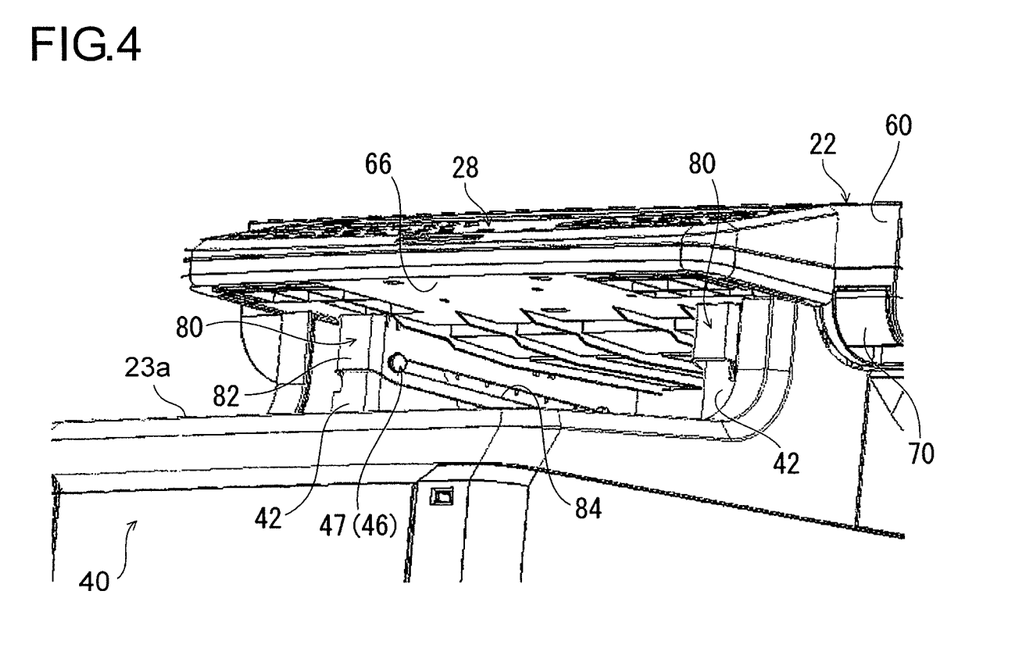
FIG. 4 is an enlarged perspective view of surrounding of a discharge tray of the image forming apparatus of FIG. 1, viewed from below.

FIG. 4 is a perspective view of a front side of the image reading part 20 obliquely viewed from below. A top surface of the casing 22 having the contact glass 31 has the operation keys and the operation screen of the operation panel 28 and opposes a bottom surface 66 of the cover, and rims of these top surface and bottom surface 66 range to a front surface 60, a back surface 62, and side surfaces 64 of the casing 22, as shown in FIG. 1. Specifically, the side surfaces 64 and 64 oppose each other at both longitudinal end portions of the casing 22. End parts on an apparatus front side of these side surfaces 64 and 64 connect to the front surface 60 on which the operation panel 28 is arranged, and the front surface 60 opposes the back surface 62 located on a rear side of the apparatus.

Figure 5:
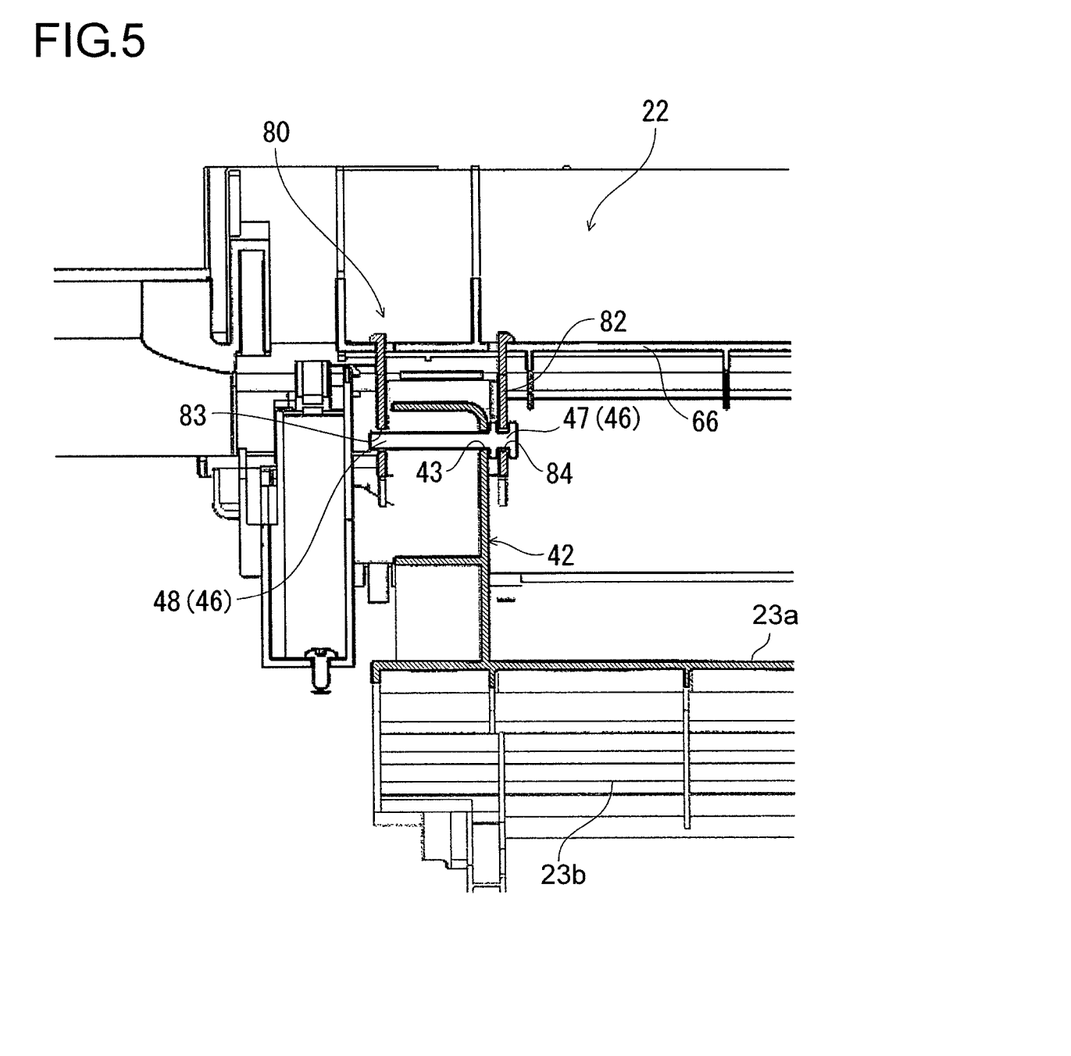
FIG. 5 is a longitudinal sectional view of a coupling portion between a casing and an outer cover in FIG. 4.

Provided at an appropriate position of this back surface 62 is a turning support point 21 which supports the casing 22 of the image reading part 20, so that the casing 22 is turnably supported to the apparatus main body 40. Also provided at a position of the bottom surface 66 opposing the top surface 23a of the outer cover 23 is a suspending mechanism that couples together the casing 22 and the outer cover 23. Specifically, as shown in FIGS. 4 and 5, the suspending mechanism of this embodiment is composed of: rail members (open rails) 80, arm parts 42, and a link pin (pin member) 46.

The open rails 80 are formed on the bottom surface 66 of the casing 22. More specifically, the open rails 80 are respectively located at right and left ends of the top surface 23a of the outer cover 23 functioning as the discharge tray 17 in FIG. 4 and has cylindrical main bodies 82 that open downwardly of the MFP 100. An opening part of the cylindrical main body 82 is formed into a rectangular shape with its rim connecting to a peripheral wall, extending from the front to back surfaces of the MFP 100. At the peripheral wall of the cylindrical body 82, an outer groove part 83 and an inner groove part 84 are provided in a manner such as to penetrate through this peripheral wall (see FIGS. 4, 5, and 8).

More specifically, the inner groove part 84 is arranged at an area of the cylindrical main body 82 adjacent to the top surface 23a of the outer cover 23, extending from the front to back surfaces of the MFP 100. On the other hand, the outer groove part 83 also similarly extends from the front to back surfaces of the MFP 100 but is located on a side opposite to the inner groove part 84, and the outer groove part 83 and the inner groove part 84 receive the link pin 46 while opposing to each other at substantially same heights.

The link pin 46 has a head part 47 and a leg part 48. The head part 47 is arranged at the inner groove part 84 and the leg part 48 is arranged at the outer groove part 83. At the cylindrical main body 82 near a rear end of the outer groove part 83, a turning support part 86 is provided in a manner such as to penetrate through the peripheral wall of the cylindrical main body 82 (see FIGS. 9 and 10), and turnably supports a holding link (holding member) 52 to be described below. Provided at the casing 22 are hook members 72 that engage with the apparatus main body 40 (see FIG. 8). The hook members 72 protrude downwardly from the bottom surface 66 of the casing 22.

Figure 6:
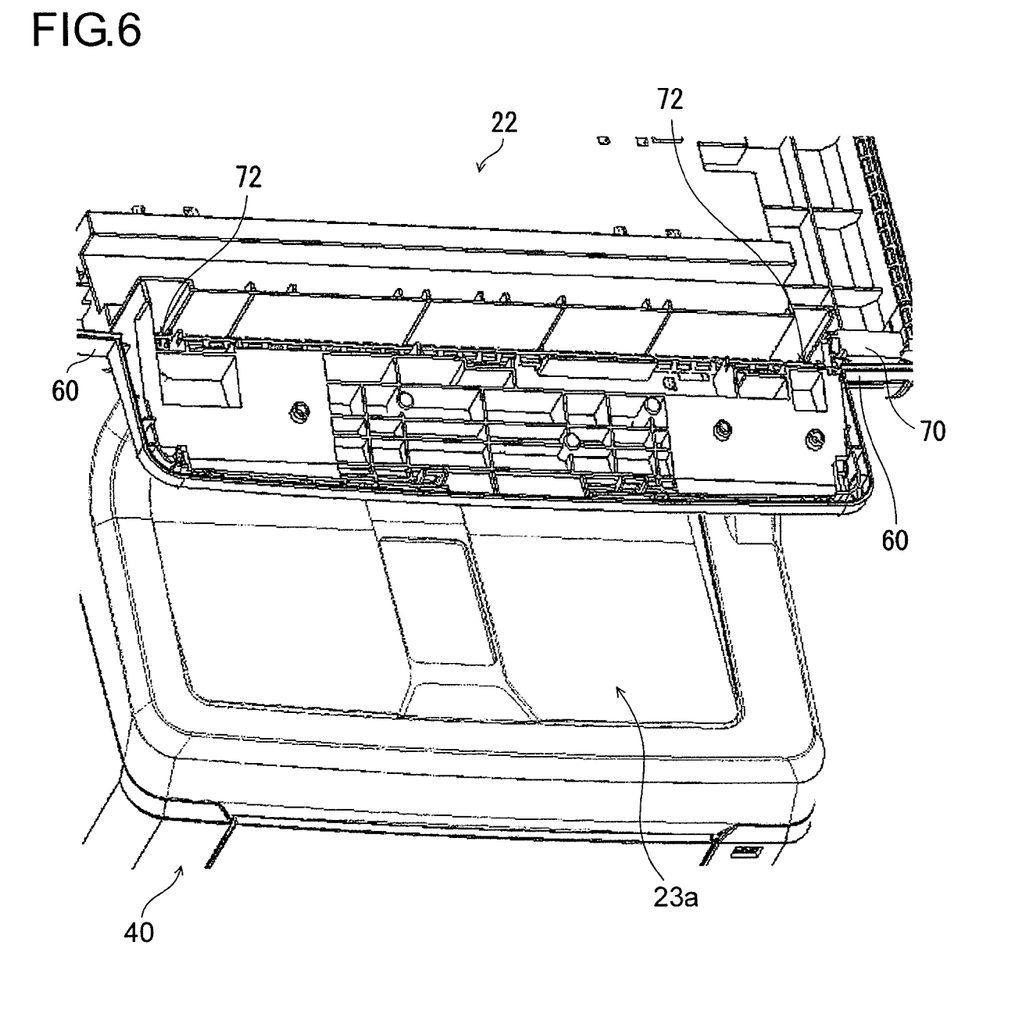
FIG. 6 is an enlarged perspective view of the surrounding of the discharge tray of FIG. 4, viewed from above.

FIG. 6 is a perspective view of the casing 22 viewed from above in a state in which the top surface having the contact glass 31 and the cover having the operation keys and the operation screen of the operation panel 28 are removed. As shown in FIG. 6, the hook members 72 are formed in a manner such as to be capable of engaging with right and left sides of a portion of the apparatus main body 40 protruding upward near the front surface 60.

Further, as shown in FIGS. 4 and 6, arranged at the front surface 60 on a right side of the operation panel 28 is an operation lever 70. Pulling the operation lever 70 forward can release the engagement between the hook members 72 and the apparatus main body 40. On the other hand, the arm parts 42 described above are provided at the top surface 23a of the outer cover 23. The arm parts 42 are also respectively formed at right and left ends of the top surface 23a functioning as the discharge tray 17, and a tip part of the arm part 42 protrudes from below the opening part of the cylindrical main body 82, and received between the peripheral walls respectively provided with the outer groove part 83 and the inner groove part 84 penetrating therethrough (see FIG. 8).

Figure 8:
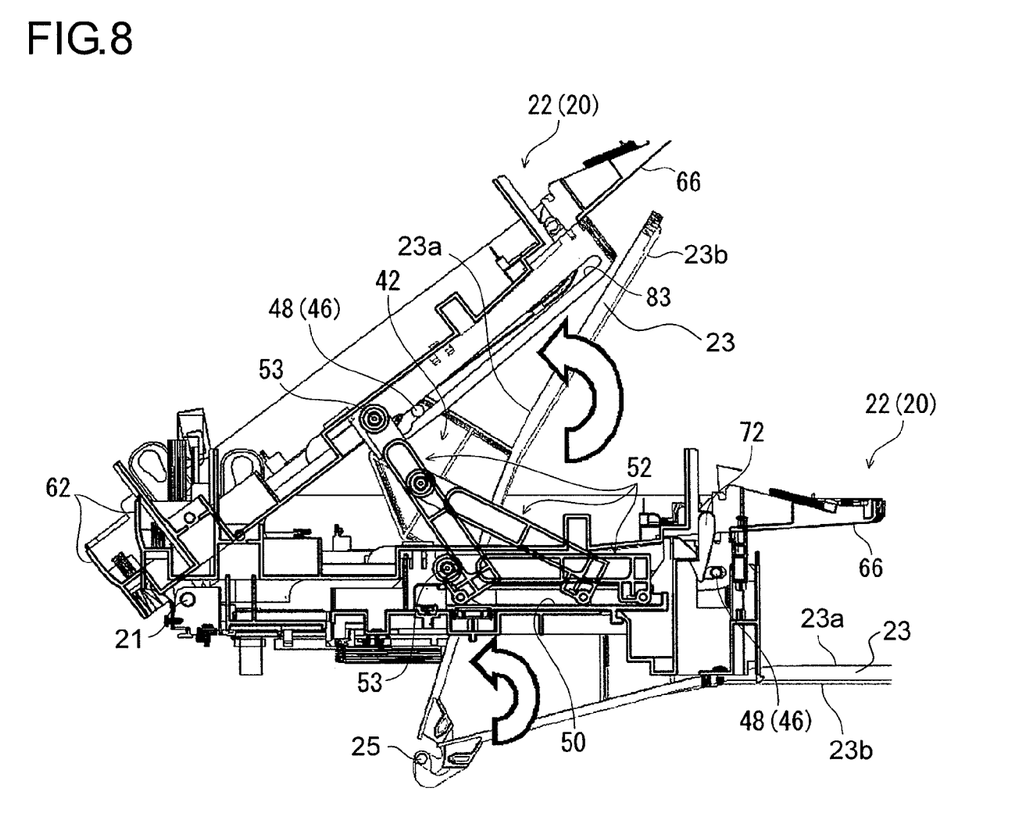
FIG. 8 is a partial side view of the image forming apparatus shown with turning support points of FIGS. 1 and 7 matched.
Figure 9:
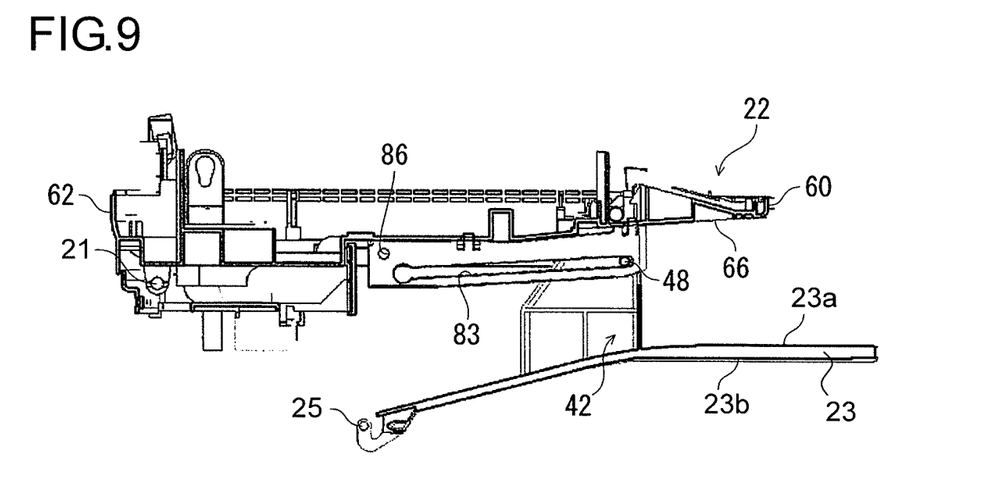
FIG. 9 is a side view showing a closed state of the outer cover of FIG. 8.

At the arm part 42, a penetration hole 43 opposite to the outer groove part 83 and the inner groove part 84 is provided in a manner such as to penetrate through the arm part 42. The penetration hole 43 is arranged between the outer groove part 83 and the inner groove part 84 and the open rail 80 on the casing 22 side and the arm part 42 on the outer cover 23 side are coupled together with the link pin 46, whereby the outer cover 23 is suspended from the casing 22. Moreover, as shown in FIG. 8, at a rear end part of the outer cover 23, the turning support point 25 supporting the outer cover 23 is provided, and as is the case with the casing 22, the outer cover 23 is also turnably supported to the apparatus main body 40.

Figure 7:
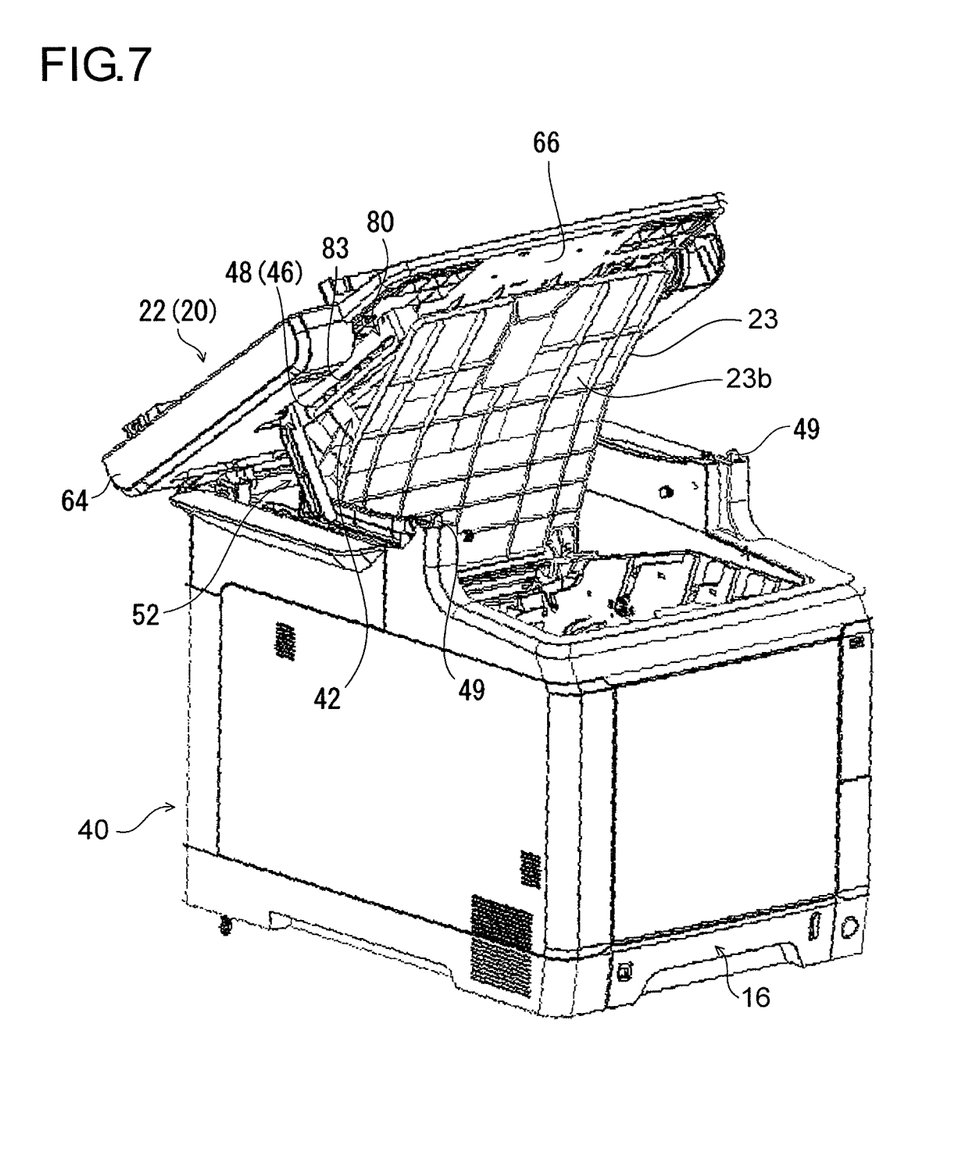
FIG. 7 is an external perspective view showing a state in which the outer cover of the image forming apparatus of FIG. 1 is open.

As described above, while the casing 22 and the outer cover 23 are coupled together at the bottom surface 66 of the casing 22 where the top surface 23a is projected, the casing 22 and the apparatus main body 40 are coupled together on an outer side of the outer cover 23 (side distant from a turning end direction of the image reading part 20). Specifically, as shown in FIGS. 7 and 8, the holding links 52 are respectively provided on a further outer side of the peripheral wall through which the outer groove part 83 of the open rail 80 penetrate when viewed from the outer cover 23.

Figure 11A:
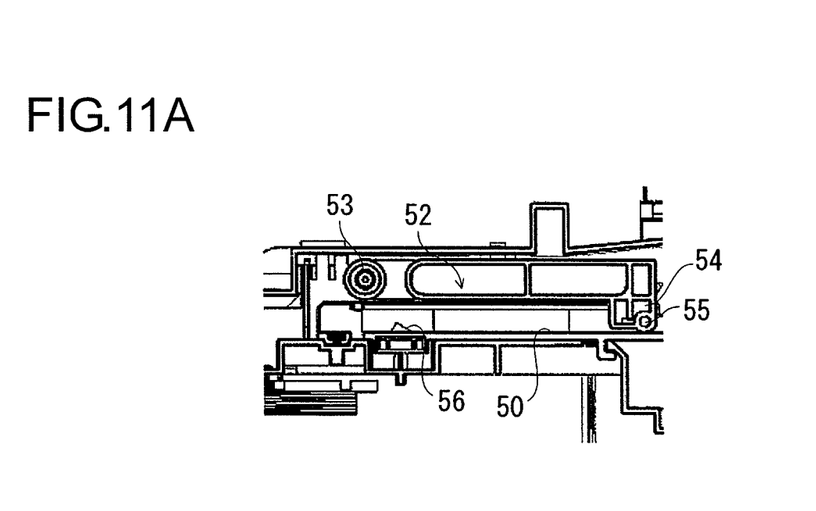
FIG. 11A is a side view of a holding link in the closed state of FIG. 9.

Formed at one end of this holding link 52 is a turning part 53, which is coupled to the turning support part 86 near the outer groove part 83 described above. On the other hand, formed at the other end of the holding link 52 is a slide part 54 (FIG. 11A), which has a round, thin pin 55. The round, thin pin 55 slidably engages with a holding rail 50 formed on right and left sides of a portion of the apparatus main body 40 protruding upward.

This slide part 54 is biased by an assist spring, not shown. Specifically, the assist spring couples together the round, thin pin 55 and a back surface side of the apparatus main body 40, and quickly moves the slide part 54 toward the back surface side of the apparatus main body 40 upon opening operation of the casing 22, that is, when the holding link 52 shifts from a posture of FIG. 11A to a posture of FIG. 11B. On the contrary, the assist spring has a dumper function, with which, upon closing operation of the casing 22, that is, when the holding link 52 shifts from the posture of FIG. 11B to the posture of FIG. 11A, the slide part 54 is moved slowly toward a front surface side of the apparatus main body 40.

In the MFP 100 of this embodiment, pulling the operation lever 70 forward to release the engagement between the hook members 72 and the apparatus main body 40 in the state of FIG. 1 causes the front surface 60 side of the casing 22 to lift up from the apparatus main body 40 by approximately 10 mm. This is because the casing 22 was pushed up by projections 49 shown in FIG. 7. More specifically, on right and left sides of a portion of the apparatus main body 40 protruding upward, trigger springs (not shown) are respectively provided to bias the projections 49 upward. As a result, releasing the engagement between the hook members 72 and the apparatus main body 40 causes the projections 49 to push up the front surface 60 side of the casing 22 by a bias force of the trigger springs.

At this point, the push-up of the casing 22 by the projections 49 assists the release of the engagement between the hook members 72 and the apparatus main body 40, thus making it possible to perform smooth release operation. Moreover, an operator can easily recognize the release of the lock mechanism by looking at the lift-up of the casing 22.

Subsequently, holding and lifting up the front surface 60 side of the casing 22 by the user causes the open rails 80 to tilt, whereby while the turning part 53 of the holding link 52 turns with respect to the open rails 80 of the casing 22, the slide part 54 moves along the holding rail 50 from the front to back surface sides of the MFP 100. As a result, the casing 22 starts to open in a direction of arrow of FIG. 8 with respect to the turning support point 21 as a center. The holding link 52 of FIG. 8 is shown in an intermediate posture in addition to the postures of FIGS. 11A and 11B.

Figure 10:
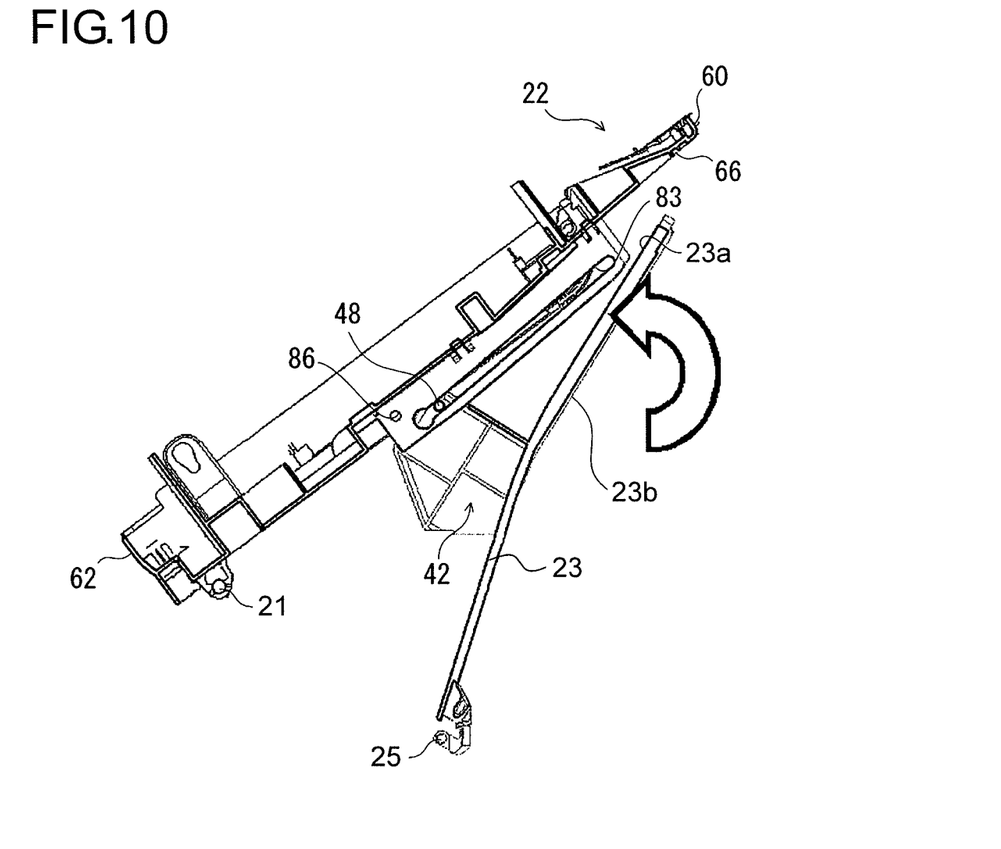
FIG. 10 is a side view showing an open state of the outer cover of FIG. 8.

At the same time, in accordance with the tilt of the open rails 80, the link pin 46 connected to the arm parts 42 of the outer cover 23 is guided from a front side position of the outer groove part 83 and the inner groove part 84 of the open rail 80 (right end position of the outer groove part 83 in FIG. 9 where the leg part 48 of the link pin 46 is shown) to a rear side position of the outer groove part 83 and the inner groove part 84 (left end position of the outer groove part 83 in FIG. 10); therefore, the outer cover 23 opens in a direction of arrow of FIG. 10 with respect to the turning support point 25 as a center (open angle: approximately 60 degrees).

The open angle of the outer cover 23 further increases with a distance between the turning support point 21 of the casing 22 and the turning support point 25 of the outer cover 23. Here, at the holding rail 50 described above, a stopper 56 is provided (FIGS. 11A and 11B). This stopper 56 is provided at a position in contact with the slide part 54 of the holding link 52 in the posture of FIG. 8 or 11 and can holds a full open position of the casing 22.

Figure 11B:
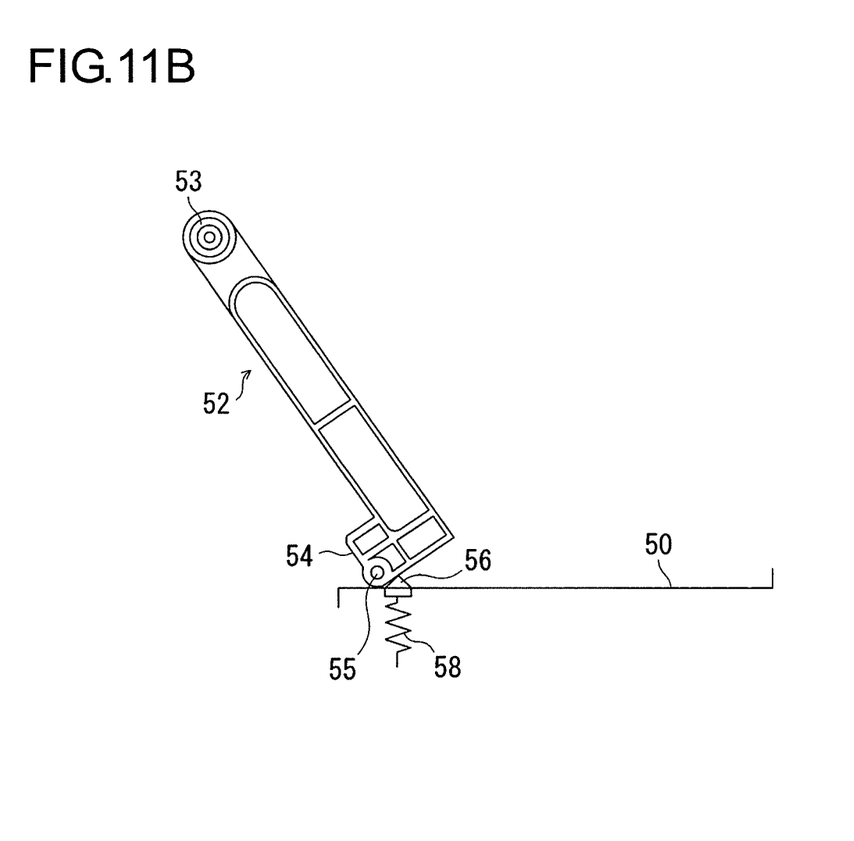
FIG. 11B is a side view of the holding link in the open state of FIG. 10.

More specifically, this stopper 56 is biased upwardly by a stopper spring 58 (FIG. 11B). Upon contact of the slide part 54 in the posture of FIG. 11A with the stopper 56 as a result of moving along the holding rail 50 toward the back surface side of the MFP 100, the stopper 56 is pushed in toward an area below the holding rail 50 against a bias force of the stopper spring 58.

On the other hand, upon further movement of the slide part 54 from a position of the pushed stopper 56 toward the back surface side of the MFP 100, the stopper 56 jumps out from a top surface of the holding rail 50 against the bias force of the stopper spring 58, thereby locking the slide part 54. As a result, the casing 22 that has opened in the direction of arrow of FIG. 8 with respect to the turning support point 21 as the center is held in a posture shown in FIG. 7 (open angle: approximately 40 degrees).

Then as shown in FIG. 7, when a bottom surface 23b of the outer cover 23 has become visible from outside, the user can access the service units stored in the apparatus main body 40, that is, the aforementioned intermediate transfer belt 8, drum units 27a to 27d, developing devices 3a to 3d, toner containers 4a to 4d, etc. in this embodiment, so that these service units can easily be replaced.

When the engagement between the slide part 54 of the holding link 52 and the stopper 56 has been released to turn the casing 22 downward (oppositely to the arrow of FIG. 8) after the replacement of the service units, the outer cover 23 coupled with the arm parts 42 also turns downward accordingly. Then when the image reading part 20 and the outer cover 23 have returned to the state of FIG. 1, the image reading part 20 and the apparatus main body 40 are coupled together again by the hook members 72.

As described above, according to this embodiment, the apparatus main body 40 stores the print engines (image forming parts) Pa to Pd, the casing 22 stores the image reading part 20, and this casing 22 is openable and closable with respect to the apparatus main body 40. The outer cover 23 has the top surface 23a opposing the bottom surface 66 of the casing 22 to form a loading space for discharged paper and has the bottom surface 23b externally equipped with the print engines Pa to Pd, and this outer cover 23 is also openable and closable with respect to the apparatus main body 40.

The suspending mechanism is provided between the bottom surface 66 of the casing 22 and the top surface 23a of the outer cover 23. More specifically, the open rails 80 are formed at the bottom surface 66 of the casing 22, the open rails 80 and the arm parts 42 of the outer cover 23 are coupled together by the link pin 46, so that the outer cover 23 is suspended from the bottom surface 66 of the casing 22. Coupling the outer cover 23 to the casing 22 with the open rails 80 and the link pin 46 in this manner can reduce the number of components compared to conventional art, thereby achieving manufacturing cost reduction.

Since the open rails 80 and the link pin 46 are arranged not in the apparatus main body 40 but at a portion where the bottom surface 66 of the casing 22 and the top surface 23a of the outer cover 23 oppose each other, in other words, a portion where the top surface 23a of the outer cover 23 is projected on the bottom surface 66 of the casing 22. Therefore, compared to the conventional art, a space for arranging a plurality of link members at the apparatus main body is no longer required, so that the apparatus main body 40 can be made compact and also even when the casing 22 of the image reading part 20 is opened with respect to the apparatus main body 40, the open rails 80 and the link pin 46 are hardly seen and thus a secondary external view of the MFP 100 is not damaged.

The suspending mechanism of this embodiment is arranged at the top surface 23a of the outer cover 23, more specifically, in a space between an inner region of the apparatus main body 40 and an outer region of the paper loading space, which contributes to forming a compact apparatus main body, compared to conventional configuration such that a plurality of link members are arranged in the apparatus main body.

Arranging the turning support point 25, which supports the outer cover 23, closer to a turning end (operation panel 28) of the casing 22 than the turning support point 21 which supports the casing 22 can make the open angle of the outer cover 23 larger than the open angle of the image reading part 20, which permits improvement in performance of replacement operation of the service units, that is, the intermediate transfer belt 8, the drum units 27a to 27d, the developing devices 3a to 3d, the toner containers 4a to 4d, etc. in this embodiment even with the limited open angle of the image reading part 20.

There is no need of opening the large-weight image reading part 20 up to a high position, which can therefore reduce operator's labor. Moreover, the rotation moment added to the turning support point 21 as a result of the turning of the image reading part 20 decreases, which therefore simplifies configuration of the turning support point 21, can prevent deformation of and damage to the components forming the turning support point 21, and further improves safety.

Increasing the open angle of the outer cover 23 does not cause interference between the outer cover 23 and the casing 22 located above the outer cover 23, so that there is no need of heightening the position of the image reading part 20 to broaden the space between the casing 22 and the outer cover 23. Therefore, without leading to apparatus upsizing and operability deterioration, the performance of the replacement operation of the service units can be improved with simple configuration. Moreover, since the outer cover 23 can be opened in conjunction with the opening and closing operation of the image reading part 20, procedures taken at time of the replacement of the service units can be further simplified.

The opening of the outer cover 23 is performed by the suspending mechanism provided at the top surface 23a of the outer cover 23, while the open posture of the image reading part 20 (casing 22) is held by the holding link 52 and the stopper 56 provided outside of the outer cover 23. Further, in a state in which the open posture of the image reading part 20 is maintained, the holding link 52 moves in a direction separating from the open side. This configuration makes it easier to access inside of the apparatus main body 40 and perform operation of attaching and detaching the members.

Specifically, since only the image reading part 20 that weighs more than the outer cover 23 is supported on the apparatus main body 40 side, the space where the image reading part 20 and the apparatus main body 40 oppose each other can more effectively be utilized, compared to the conventional configuration such that the outer cover 23 in addition to the image reading part 20 is supported on the apparatus main body 40 side.

The invention is not limited to the embodiment described above, and various modifications can be made to the invention within a range not departing from the spirits of the invention. For example, the invention is applicable not only to the MFP 100 as shown in FIG. 1, but also to other image forming apparatuses provided with an image reading part above an apparatus main body, such as a digital or analog monochromatic copier, a color copier provided with a rotary type or ink-jet-type image forming part, etc. In any of these cases, as is the case with the above, provided is effect that the number of components can be reduced, and without impairing the downsizing of the apparatus main body and the secondary external view of the apparatus, it is easy to access the inside of the apparatus main body.

With the configuration of the invention, since the coupling of the outer cover to the image reading part with the suspending mechanism does not cause the interference with the image reading part located above upon opening of the outer cover, there is no need of heightening the position of the image reading part to broaden the space between the image reading part and the outer cover. Therefore, without leading to the apparatus upsizing and the operability deterioration, the performance of maintenance operation including cartridge replacement can be improved with the simple configuration. Moreover, since the outer cover can be opened and closed in conjunction with the opening and closing operation of the image reading part, the procedures of opening and closing the outer cover can be further simplified.

Arranging the first turning support point of the outer cover on a turning end side of the image reading part from the second rotation support point of the image reading part permits the open angle of the outer cover to be increased without opening the image reading part up to a high position, thereby further improving the performance of maintenance operation and also reducing the operator's labor. Moreover, since the rotation moment added to the turning support point as a result of the turning of the image reading part is reduced, the configuration of the turning support point is simplified, which can prevent the deformation of and damage to the components forming the turning support point and can also improve the safety.

What is claimed is:

1. An image forming apparatus comprising:
    an apparatus main body including an image forming part therein;
    an outer cover turnably supported at a first turning support point of the apparatus main body, the outer cover opening and closing a top surface of the apparatus main body;
    an image reading part arranged above the outer cover with a predetermined space therefrom and supported; at a second turning support point of the apparatus main body in a manner such as to be turnable in the same direction as a direction in which the outer cover turns; and
    a suspending mechanism turnably coupling together the image reading part, and the outer cover wherein
    the first turning support point is arranged with a distance from the second turning support point toward a turning end and
    the suspending mechanism is composed of: an open rail arranged at a bottom surface of the image reading part and extending from the turning support point of the image reading part toward the turning end; an arm part fixed to the outer cover and slidably engaging with the open rail; and a pin member coupling together the open rail and the arm part.

2. The image forming apparatus according to claim 1, wherein
    a holding link turnably coupled to the image reading part is provided, a holding rail slidably supporting a turning end of the holding link is provided on an apparatus main body side, and a stopper supporting the holding link at the holding rail with a predetermined angle is provided.

3. The image forming apparatus according to claim 2, wherein
    the turning end of the holding link is supported in a manner such as to be movable along a direction in which the holding rail extends with respect to the apparatus main body, and following an opening operation of the image reading part, the turning end of the holding link moves from a turning end side of the image reading part toward the second turning support point.

4. The image forming apparatus according to claim 1, wherein
    a top surface of the outer cover forms a discharge and loading space for a recording medium onto which an image is outputted at the image reading part, and the suspending mechanism is arranged in, of the top surface of the outer cover, an outer region of the discharge and loading space for the recording medium.

5. The image forming apparatus according to claim 1, wherein
    a lock mechanism is provided which has: a hook member provided at the turning end of the image reading part and engaging with the apparatus main body; and an operation lever releasing the engagement of the hook member.

6. The image forming apparatus according to claim 5, wherein
    a projection capable of appearing with respect to the top surface of the apparatus main body and a bias member biasing the projection toward a projection direction thereof are provided, and following the release of the engagement between the hook member and the apparatus main body by the operation lever, the projection pushes up the image reading part from the apparatus main body by a predetermined amount.

* * * * *